(12) United States Patent
Anna et al.

(10) Patent No.: US 8,856,206 B2
(45) Date of Patent: Oct. 7, 2014

(54) MAINTAINING MESSAGE VERSIONS AT NODES IN A NETWORK

(75) Inventors: Gary Anna, Tucson, AZ (US); Ralph Thomas Beeston, Tucson, AZ (US); Thomas William Bish, Tucson, AZ (US); Joseph Whitney Dain, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 1105 days.

(21) Appl. No.: 11/846,433

(22) Filed: Aug. 28, 2007

(65) Prior Publication Data
US 2009/0063582 A1 Mar. 5, 2009

(51) Int. Cl.
| | |
|---|---|
| *G06F 15/16* | (2006.01) |
| *H04L 29/06* | (2006.01) |
| *H04L 12/58* | (2006.01) |
| *G06Q 10/10* | (2012.01) |
| *H04L 12/54* | (2013.01) |
| *H04L 29/08* | (2006.01) |
| *G06F 3/038* | (2013.01) |

(52) U.S. Cl.
CPC ............... *H04L 69/24* (2013.01); *H04L 12/58* (2013.01); *G06Q 10/107* (2013.01); *H04L 12/5695* (2013.01); *H04L 69/329* (2013.01); *G06F 3/038* (2013.01)
USPC ........... 709/203; 709/206; 709/230; 370/236; 370/252; 370/254; 370/278; 455/518; 455/519

(58) Field of Classification Search
USPC ........................... 709/203, 206; 370/252, 278
See application file for complete search history.

(56) References Cited

U.S. PATENT DOCUMENTS 7,409,455 B2 * 8/2008 Giloi et al. .................... 709/230
(Continued)

FOREIGN PATENT DOCUMENTS

| EP | 0 279 232 | 8/1988 | | |
|---|---|---|---|---|
| EP | 0279232 | 8/1988 | | |
| EP | 279232 A2 * | 8/1988 | .............. | G06F 15/16 |

OTHER PUBLICATIONS

"IBM Reliable Scalable Cluster Technology: Messages", IBM Corp., Sep. 2004.*

(Continued)

*Primary Examiner* — Kyung H Shin
(74) *Attorney, Agent, or Firm* — David W. Victor; Konrad Raynes Davda & Victor LLP

(57) ABSTRACT

Provided are a method, system, and article of manufacture for maintaining message versions at nodes in a network. The nodes in the network maintain version information of nodes in the network. The version information for the nodes indicates a message version number of messages supported at the node. The nodes supporting one message version number can receive messages having that message version number. The nodes use the version information to determine whether there is at least one common message version number among the nodes The nodes supporting the at least one common message version number negotiate to join a quorum of the nodes having the at least one common message version number.

27 Claims, 8 Drawing Sheets

| Node ID | Message State | Min Message Version Number | Max Message Version Number |
|---|---|---|---|
| 52 | 54 | 56 | 58 |

50

Node Information Entry

(56) References Cited

U.S. PATENT DOCUMENTS

| | | | |
|---|---|---|---|
| 7,466,659 B1* | 12/2008 | Kazar et al. | 370/252 |
| 7,602,723 B2* | 10/2009 | Mandato et al. | 370/236 |
| 2002/0161889 A1* | 10/2002 | Gamache et al. | 709/226 |
| 2002/0198951 A1* | 12/2002 | Thurlow et al. | 709/206 |
| 2004/0210673 A1* | 10/2004 | Cruciani et al. | 709/246 |
| 2005/0125461 A1 | 6/2005 | Filz | |
| 2005/0157660 A1* | 7/2005 | Mandato et al. | 370/254 |
| 2005/0188104 A1 | 8/2005 | Tan et al. | |
| 2006/0073843 A1* | 4/2006 | Aerrabotu et al. | 455/519 |
| 2006/0271606 A1 | 11/2006 | Tewksbary | |
| 2006/0282545 A1 | 12/2006 | Arwe et al. | |

OTHER PUBLICATIONS

S. Ajmani, et al., "Modular Software Upgrades for Distributed Systems", ECOOP 2006 Object-Oriented Programming, 20th European Conference Proceedings, pp. 452-476, Jul. 2006.

J.W. Knight, "Data Driven Exceptions", IBM Corp., Technical Disclosure Bulletin, pp. 3739-3741, Dec. 1984.

P. Wang, et al., "Scalable Concurrent B-Trees Using Multi Version Memory", Journal of Parallel and Distributed Computing, vol. 32, No. 1, pp. 28-48, Jan. 1996.

J. Sikora et al., "Conversion of a Single Process CFD Code to Distributed and Massively Parallel Processing", Advances in Engineering Software, vol. 29, Nos. 3-6, pp. 331-336, Apr.-Jul. 1998.

\* cited by examiner

MAINTAINING MESSAGE VERSIONS AT NODES IN A NETWORK

BACKGROUND OF THE INVENTION

1. Field of the Invention

The present invention relates to a method, system, and article of manufacture for maintaining message versions at nodes in a network.

2. Description of the Related Art

Applications in nodes in a network may communicate using a message program that supports predefined messages. The different nodes in the network may have different message version numbers for the messages. To ensure that nodes communicating in a quorum or domain maintain at least one common message version number, the existing nodes in the quorum may govern the ability of a node attempting to join the quorum by preventing a node from joining that does not support a message version supported by the current nodes in the quorum.

A node seeking to join a quorum may initiate a version negotiation algorithm by sending a version request message to all nodes in the quorum/domain. The version request message contains the minimum and maximum supported versions for each and every predefined supported message. The nodes already in the quorum receiving the join request process the content of the request message to determine the highest supported version for each message. As a version is negotiated for a group of messages, the receiving node stores the negotiated version in volatile memory. After updating the negotiated version for each supported message order in volatile memory, the receiving node sends a response message to the node seeking to join that they may join and communicate in the quorum/domain.

Further, even though nodes may support different message versions, a node system may only support sending one version of a message to all nodes in the domain even if some of the nodes support newer versions and the negotiated order is dependent upon which nodes enter the domain.

Yet further, certain messaging systems may rely on a centralized server and database to manage different versions of messages.

There is a need in the art for an improved technique for managing message versions in nodes in a network.

SUMMARY

Provided are a method, system, and article of manufacture for maintaining message versions at nodes in a network. The nodes in the network maintain version information of nodes in the network. The version information for the nodes indicates a message version number of messages supported at the node. The nodes supporting one message version number can receive messages having that message version number. The nodes use the version information to determine whether there is at least one common message version number among the nodes The nodes supporting the at least one common message version number negotiate to join a quorum of the nodes having the at least one common message version number.

DETAILED DESCRIPTION

Figure 1:
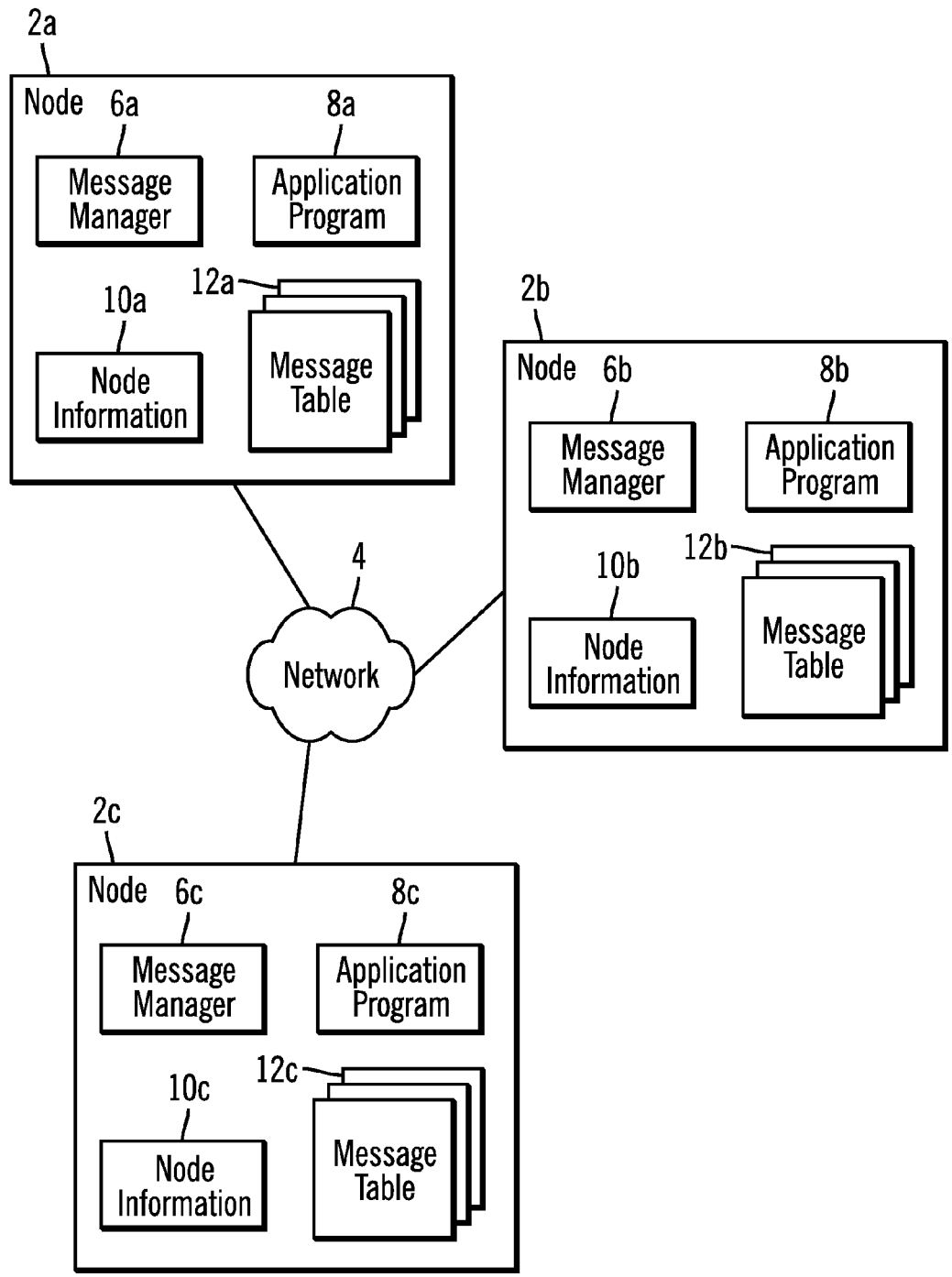
FIG. 1 illustrates an embodiment of a network computing environment.

FIG. 1 illustrates an embodiment of a network computing environment. A plurality of nodes 2a, 2b, 2c communicate over a network 4. Each node 2a, 2b, 2c includes a message manager 6a, 6b, 6c program to manage messages sent between applications 8a, 8b, 8c in the nodes 2a, 2b, 2c. The nodes 2a, 2b, 2c further include node information 10a, 10b, 10c providing message version numbers of message versions supported at the nodes 2a, 2b, 2c and a status of the nodes 2a, 2b, 2c. Each node 2a, 2b, 2c further includes one or more message tables 12a, 12b, 12c, where each message table 12a, 12b, 12c is associated with a message version number and provides a list of supported messages for the message version number.

The network 10 may comprise a Storage Area Network (SAN), Local Area Network (LAN), Intranet, the Internet, Wide Area Network (WAN), peer-to-peer network, wireless network, arbitrated loop network, etc.

Although FIG. 1 shows three nodes 2a, 2b, 2c, there may be any number of nodes in the network 4.

Figure 2:
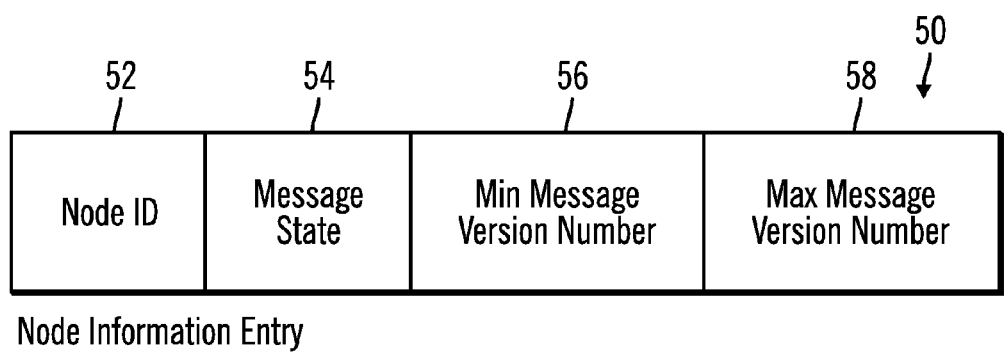
FIG. 2 illustrates an embodiment of node entry information providing information on a node in a network.

FIG. 2 illustrates an embodiment of a node information entry 50 for a node 2a, 2b, 2c in the node information 10a, 10b, 10c, including: a node identifier (ID) 52; a message state 54 indicating a state of the identified node 52; and a minimum 56 and maximum 58 supported version numbers.

The message states 54 may indicate quorum member (online or offline), excluded, pending online, and arbitrating. The quorum member state indicates that a node 2a, 2b, 2c has been negotiated into a quorum of nodes supporting at least one common message version number and is allowed to communicate with the other quorum nodes using the at least one common supported message version. A quorum provides a group of nodes that have agreed upon a message version number to use to communicate. The quorum member state has two sub-states, quorum online and quorum offline. In the quorum online state, a node 2a, 2b, 2c is part of the quorum and is currently online and available to communicate with node 2a, 2b, 2c in the quorum. In the quorum offline state, a node 2a, 2b, 2c is part of the quorum and is currently offline. A node 2a, 2b, 2c may be taken offline due to an unexpected error, reboot or a user manually taking the node 2a, 2b, 2c offline. The excluded state indicates that a node 2a, 2b, 2c is not part of the quorum and is not allowed to communicate with the other nodes in the quorum. A node 2a, 2b, 2c may transition to the excluded state as part of an update message version process to update the message version at the node. The pending online state indicates that the node is not part of the quorum but is attempting to become part of the quorum by initiating the negotiation algorithm. The arbitrating state indicates that the node is currently arbitrating/negotiating to become part of the quorum. The arbitration state may be used to prevent a race condition where two or more nodes 2a, 2b, 2c could negotiate themselves into the quorum at the same time. The arbitrating state may be used to ensure that only one node at a time attempts to join the quorum.

Figure 3:
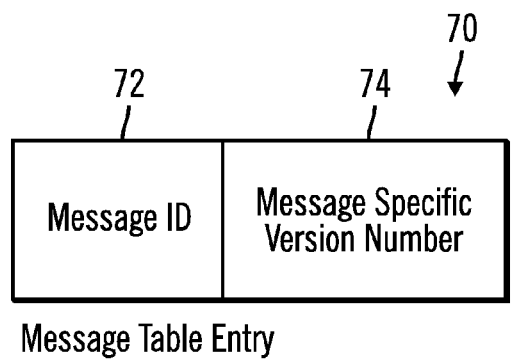
FIG. 3 illustrates an embodiment of a message table entry having information on predefined messages.

FIG. 3 illustrates an embodiment of a message table 12a, 12b, 12c entry 70, including a message identifier 72 and a message specific version number 74 indicating a version number of the message. The message table is associated with a message version number. The specific messages in the message table may be associated with the version number associated with the message table or a lower message version number if the message 72 was not updated by the higher message version number associated with the message table.

Figure 4:
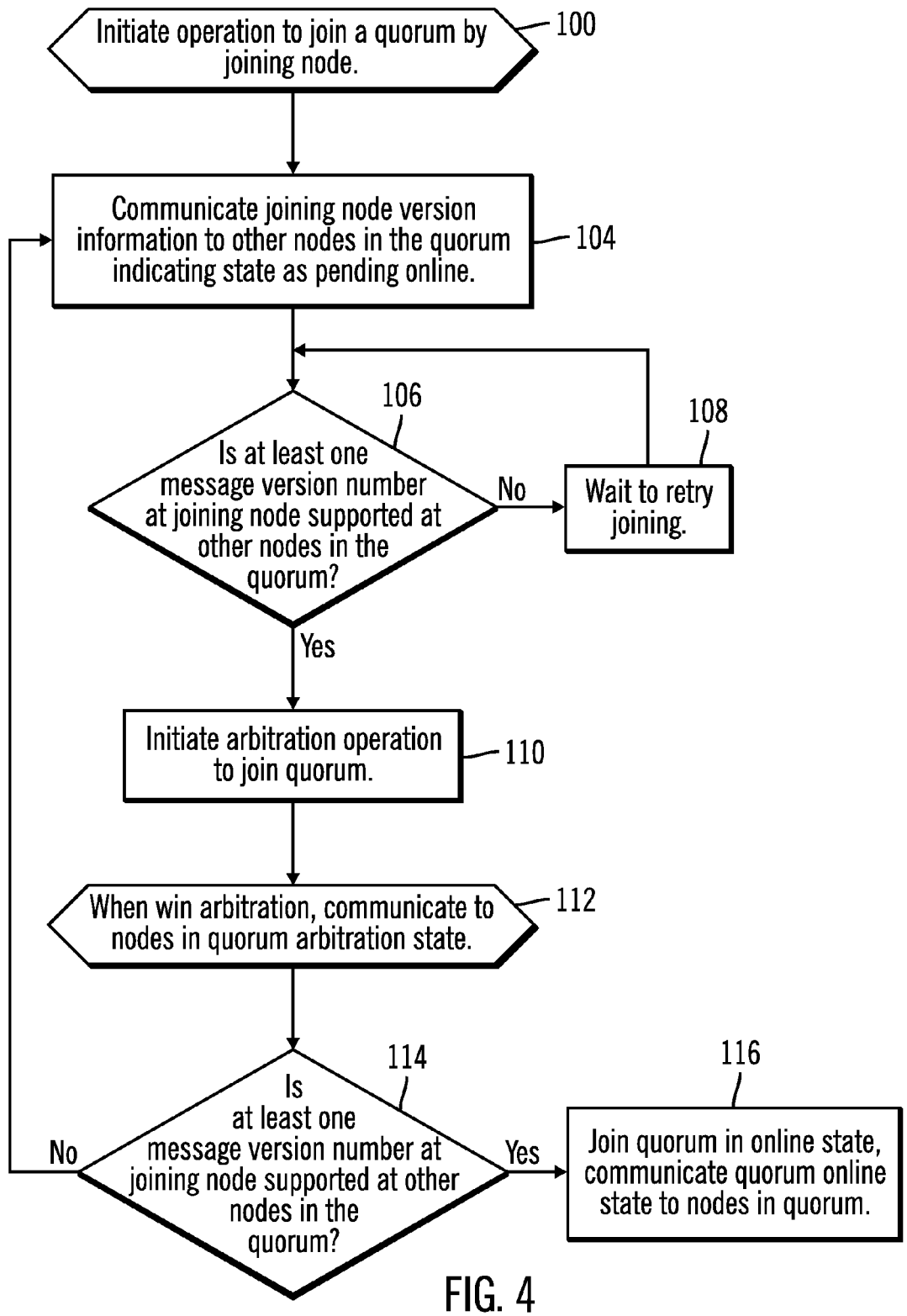
FIG. 4 illustrates an embodiment of operations for a node to perform to join a quorum.

FIG. 4 illustrates an embodiment of operations performed by the message manager 6a, 6b, 6c for one node 2a, 2b, 2c attempting to join a quorum. In one embodiment, prior to initiating the join operation, the joining node 2a, 2b, 2c may obtain the node information 10a, 10b, 10 c for the other nodes in the quorum (in the online and offline states) to join. Upon initiating (at block 100) joining operations, the joining node 2a, 2b, 2c communicates (at block 104) the joining node information 10a, 10b, 10c to the other nodes in the quorum indicating the state of the joining node as pending online. In the pending online state the node is not a member of the quorum. If (at block 106) at least one message version number at the joining node is not supported at the other nodes 2a, 2b, 2c in the quorum, as determined from the node information 10a, 10b, 10c maintained by the joining node 2a, 2b, 2c, then the joining node 2a, 2b, 2c waits (at block 108) to return to block 106 to retry the joining. The joining node may fail the joining operations after a predetermined number of unsuccessful retries. If (at block 106) at least one message version number at the joining node is supported at the other nodes 2a, 2b, 2c in the quorum in the online and offline state, then the joining node 2a, 2b, 2c initiates (at block 110) an arbitration operation to join the quorum. Joining nodes 2a, 2b, 2c initiate an arbitration operation to obtain exclusive access to join the quorum. In this way, the joining nodes serialize their join operations so that only one joining node is negotiating to join the quorum at a time. Serialization prevents one intervening node from joining the quorum before one later joining node that does not have a common message version with the intervening node completes the joining operation. When the joining node 2a, 2b, 2c wins (at block 112) arbitration, the arbitration status is communicated to the other nodes in the quorum.

If the joining node 2a, 2b, 2c winning arbitration determines (at block 114) at least one message version number at the joining node that is supported at the other nodes 2a, 2b, 2c in the quorum in the online and offline state, then the joining node 2a, 2b, 2c joins (at block 116) the quorum in the online state and communicates the quorum online state to the other nodes in the quorum. If (at block 114) there is no common message version among the joining node and the current members of the quorum, then control returns to block 104 to return the pending online state and attempt again to rejoin the quorum.

Figure 5:
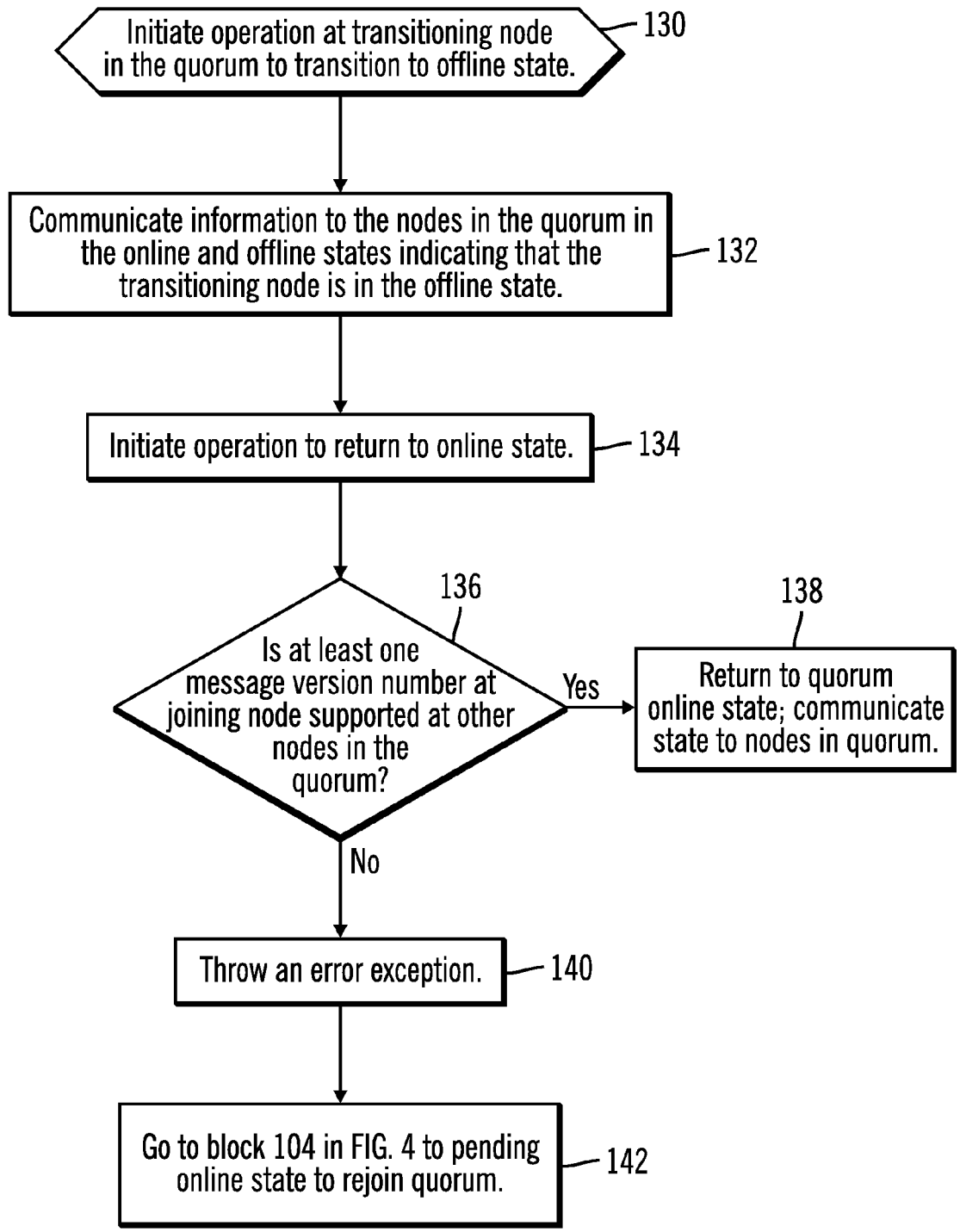
FIG. 5 illustrates an embodiment of operations for a node to transition to an offline state.

FIG. 5 illustrates an embodiment of operations performed by the message manager 6a,6b, 6c in a transitioning node 2a, 2b, 2c to transition to an offline state as a quorum member. A node may transition offline in response to a reboot, error or being manually taken offline by the user of the node. A node 2a, 2b, 2c in the offline state may still receive quorum messages related to nodes attempting to join the quorum. Thus, nodes in the offline state may not receive application related messages, but still receive a subset of the messages that nodes 2a, 2b, 2c in the online state may receive. Upon initiating (at block 130) operations to transition offline, the transitioning node 2a, 2b, 2c communicates (at block 132) information to the nodes 2a, 2b, 2c in the quorum (in the online and offline states) indicating that the transitioning node is in the offline state.

Upon an offline node 2a, 2b, 2c that is a quorum member initiating (at block 134) an operation to return to the online state, the offline node 2a, 2b, 2c determines (at block 136) whether there is a common message version supported by the offline node 2a, 2b, 2c and other current members of the quorum (in the offline and online state). If (at block 136) there is a common supported version, then the offline node 2a, 2b, 2c returns (at block 138) to the quorum online state and communicates that new state to the other nodes in quorum. If (at block 136) there is no common supported version, then the offline node 2a, 2b, 2c throws (at block 140) an error exception and proceeds (at block 142) to block 104 in FIG. 4 to rejoin the quorum in the pending online state, thus exiting the quorum. An error may be thrown because a node having message versions not supported by the offline node should not have been allowed to join the quorum while the offline node was offline, because offline quorum nodes should be considered by joining nodes when attempting to join per the operations in FIG. 4.

Figure 6:
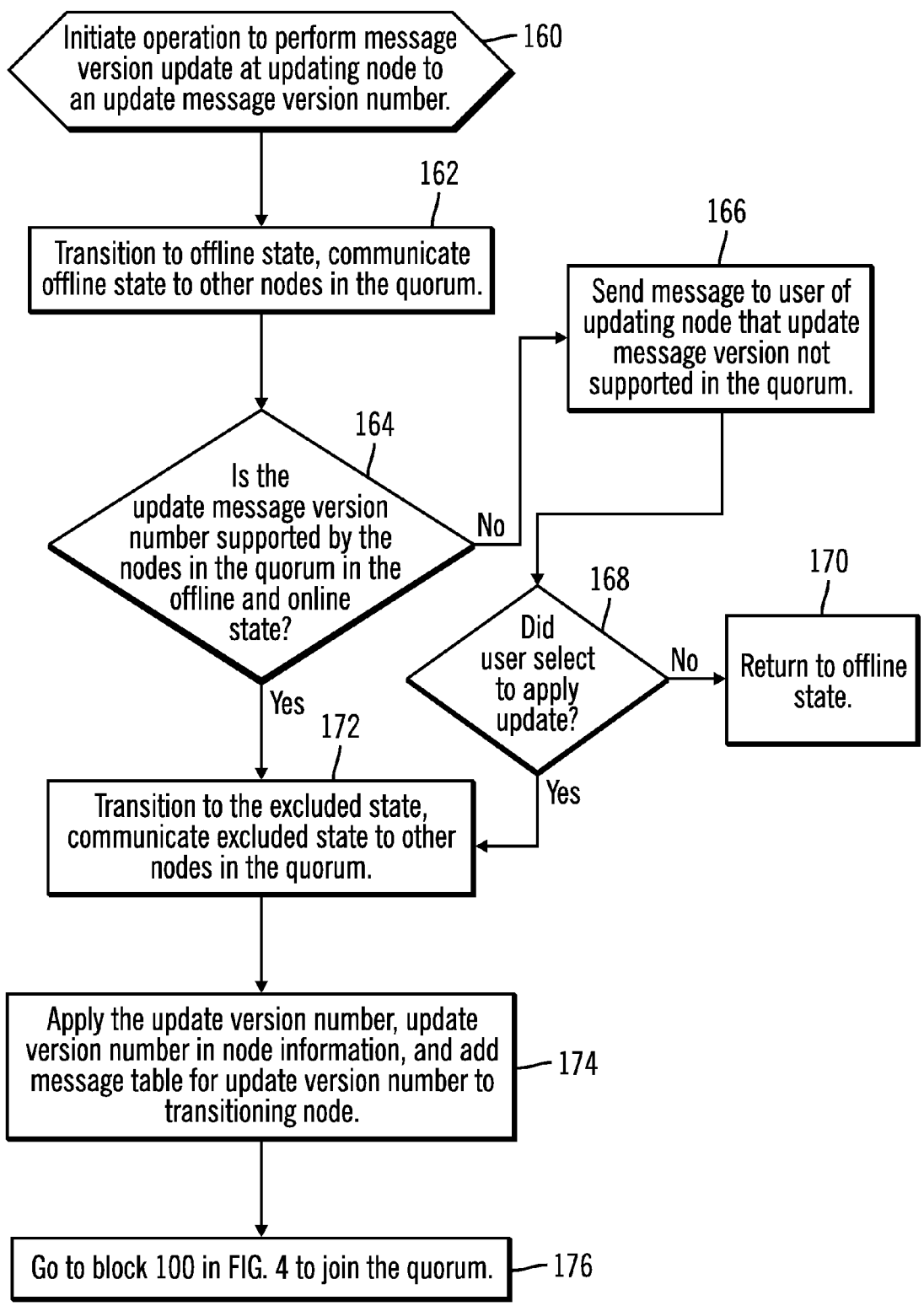
FIG. 6 illustrates an embodiment of operations for a node to update to an update message version number.

FIG. 6 illustrates an embodiment of operations performed by a message manager 6a, 6b, 6c for an updating node attempting to apply a message version update to the node that may update the message version number to an update message version number at the node and add a new message table 12a, 12b, 12c associated with the update message version number. The update message version number may comprise a higher or lower message version number than the current message version numbers supported at the updating node 2a, 2b, 2c. Upon initiating (at block 160) operations at an updating node to apply a update message version number, the update node 2a, 2b, 2c transitions (at block 162) to the offline state and communicates the offline state information to other nodes 2a, 2b, 2c in the quorum identified in the node information 10a, 10b, 10c. The updating node 2a, 2b, 2c determines (at block 164) from the node information 10a, 10b, 10c whether the update message version number involved in the update is supported by the nodes 2a, 2b, 2c in the quorum in the offline and online state. If not, then the updating node 2a, 2b, 2c sends (at block 166) a message to the user of the updating node, via a user interface, that the update message version is not supported in the quorum. The user interface may enable the user to continue with or terminate the message version update. If (at block 168) the user at the updating node 2a, 2b, 2c selected to not apply the message version update, then the updating node 2a, 2b, 2c returns (at block 170) to the offline state.

If (from the yes branch of block 164) the update version number is supported by the other nodes in the quorum or if (from the yes branch of block 168) the user selected to continue with the update, then the updating node 2a, 2b, 2c transitions (at block 172) to the excluded state and communicates the excluded state information to other nodes 2a, 2b, 2c in the quorum. In the exclude state, the quorum member nodes cannot communicate with the excluded node. The updating node 2a, 2b, 2c applies (at block 174) the update message version to the updating node 2a, 2b, 2c, updates the version number in the node information to the update message version number, and adds a message table 12a, 12b, 12c associated with the update message version number to the updating node 2a, 2b, 2c. After applying the update, the updating node 2a, 2b, 2c proceeds (at block 176) to block 100 in FIG. 4 to rejoin the quorum as an active quorum member node.

Figure 7:
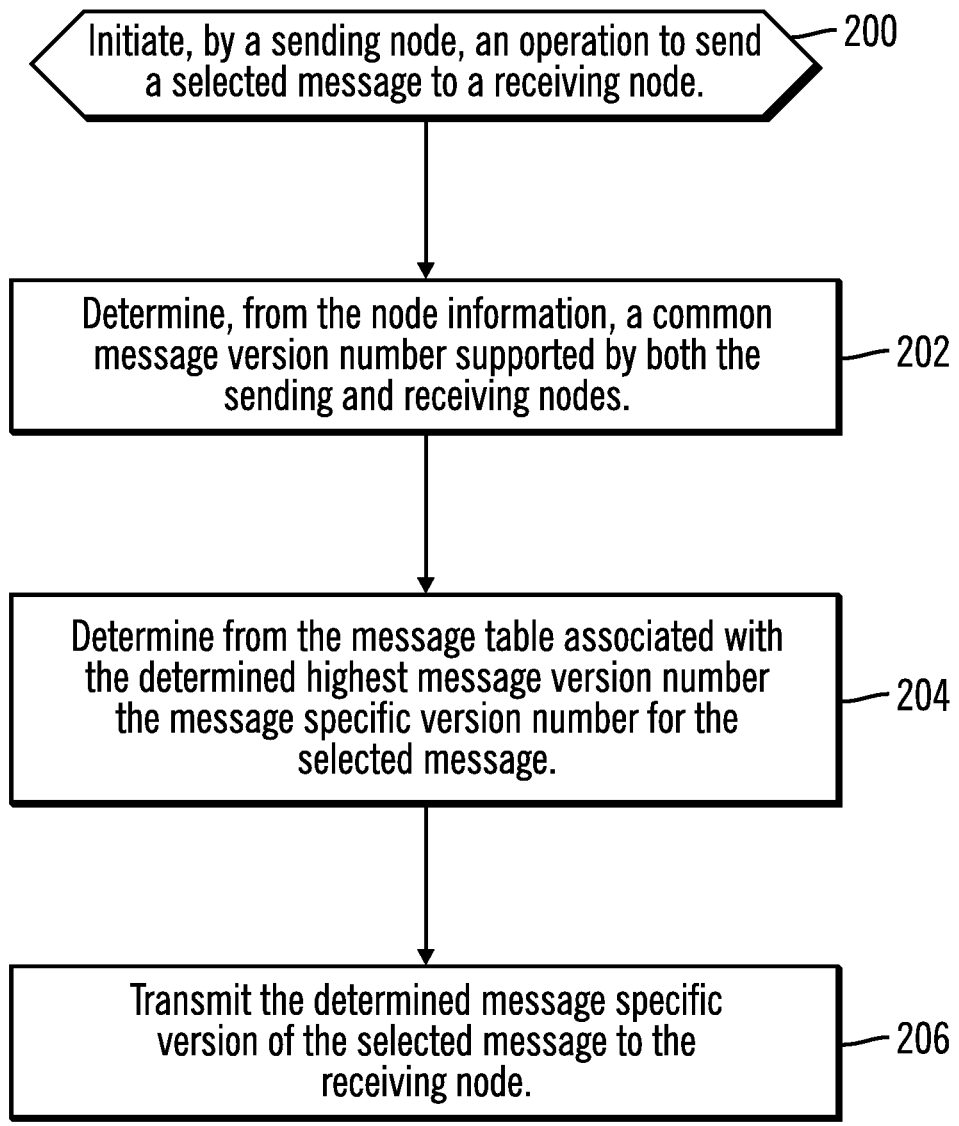
FIG. 7 illustrates an embodiment of operations for a node to determine a message specific version number of a message to send to another node.

FIG. 7 illustrates an embodiment of operations performed by a sending node 2a, 2b, 2c to send a message to a receiving node 2a, 2b, 2c in the quorum. In certain embodiments, the sent message comprises a predefined message in a message table 12a, 12b, 12c used by the application programs 8a, 8b, 8c to communicate with one another. Upon initiating (at block 200) a send message operation, the sending node 2a, 2b, 2c determines (at block 202) from the node information 10a, 10b, 10c, such as the message version number fields 56, 58 in the entries 50 (FIG. 2) for the sending and receiving nodes, a common message version number supported by both the sending and receiving nodes. The common message version number may comprise the highest message version number supported between the sending and receiving nodes. The sending node 2a, 2b, 2c then determines (at block 204) from the message table 12a, 12b, 12c associated with the determined common message version number the message specific version number 74 for the selected message 72 (FIG. 3). The sending node 2a, 2b, 2c transmits (at block 206) the determined message specific version of the selected message to the receiving node 2a, 2b, 2c.

With the described embodiments, if different nodes have different message versions, then a sending node can communicate with one receiving node using a common version that is higher than the common version that may be used to communicate with another receiving node that supports a lower common message version. In one embodiment, if a sending node is communicating a message to multiple receiving nodes, such as in the case of a broadcast message, then the sending node may use the highest common message version with respect to all the receiving nodes, even though certain of the receiving nodes may support a higher message version with the sending node.

Figure 8:
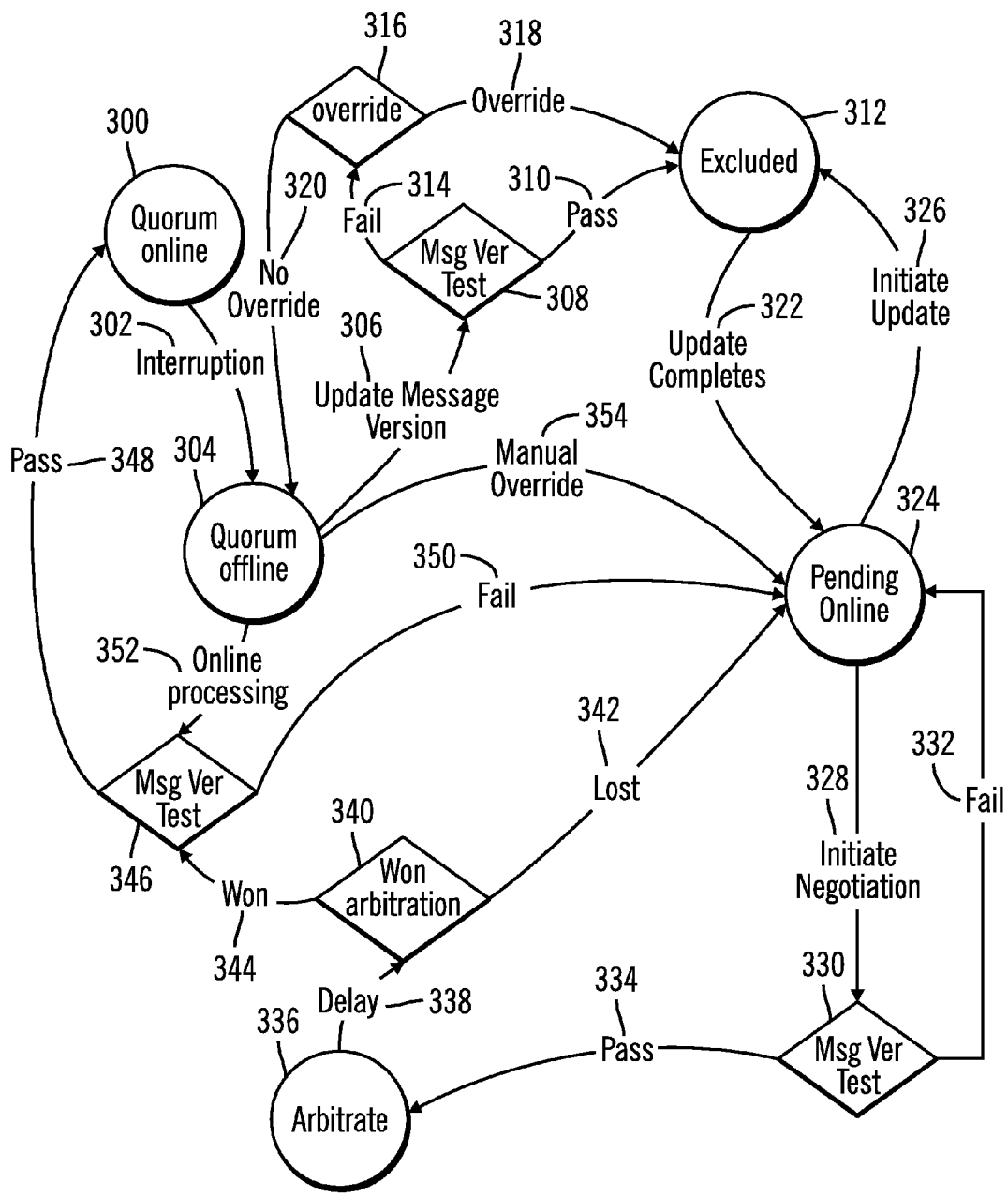
FIG. 8 illustrates an embodiment of a state diagram for node operations to participate in a quorum.

FIG. 8 provides an embodiment of a state diagram implemented by the message managers 6a, 6b, 6c to perform version number management related operations. A node 2a, 2b, 2c transitions from a quorum online state 300 to the quorum offline state 304 upon the occurrence of an interruption event 302, such as a power loss, error condition, manual offline, etc. When a customer attempts to update the message version number, the update routine 306 executes a message version test 308 that determines whether the message version number applied in the update is supported by other nodes in the quorum. If the updating node passes 310 the message version test 308, then the state transitions to the excluded state 312. If the message version test 308 fails 314, then the customer is asked by an override routine 316 whether to override the check and proceed to apply the update to the update message version number. If the customer chooses to override the failed 314 check at event override 318, then the node transitions to the excluded state 312. If the customer chooses not to override 320 the check, then the node transitions back to the quorum offline state 304.

Upon completing the update 322 to the update message version, the node 2a, 2b, 2c transitions to the pending online state 324. If the customer chooses to again initiate the update 326 while in the pending online state 324, the node 2a, 2b, 2c transitions back to the excluded state 312. When in the pending online state 324, the node 2a, 2b, 2c may initiate negotiation routine 328 by executing the message version test 330. If the node 2a, 2b, 2c fails 332 the message version test 330, then the node 2a, 2b, 2c remains in the pending online state 324. If the node 2a, 2b, 2c passes 334 the message version test 330, then the node 2a, 2b, 2c transitions to the arbitration state 336 by setting an arbitration field. After a delay time 338, the node 2a, 2b, 2c runs the arbitration routine 340 to determine whether the node 2a, 2b, 2c won arbitration. If the node 2a, 2b, 2c lost 342 arbitration, then the node 2a, 2b, 2c transitions to the pending online state 324.

If the node wins 344 arbitration, then the node may run the message version test 346 again. If the node 2a, 2b, 2c passes 348 the message version test 346, then the node 2a, 2b, 2c may transition to the quorum online state 300. If the node 2a, 2b, 2c fails 350 the message version test 346, then the node transitions back to the pending online state 324. If a node is in the quorum offline state 304 and wants to transition to the quorum online state, then the node 2a, 2b, 2c may transition 352 to the message version test 346. When a node 2a, 2b, 2c is known to be non-responsive for an extended period of time, the customer can move the node out of the quorum list by manually overriding 354 the node 2a, 2b, 2c to cause the node to transition to the online pending state 324.

Described embodiments provide techniques for nodes in a quorum to maintain a common message version number by maintaining node information at each node indicating the message version numbers supported at the nodes in the quorum and network. A node seeking to rejoin a quorum as an online node may use the version information to determine whether the message version numbers they support are supported by all the nodes in the quorum. Further, each node may maintain message tables associated with message version numbers, where the tables indicate message specific versions of messages supported at a message version number. Nodes may use the message tables and node information to determine the message specific version number of a message to transmit to a receiving node.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 5, 6, and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 9:
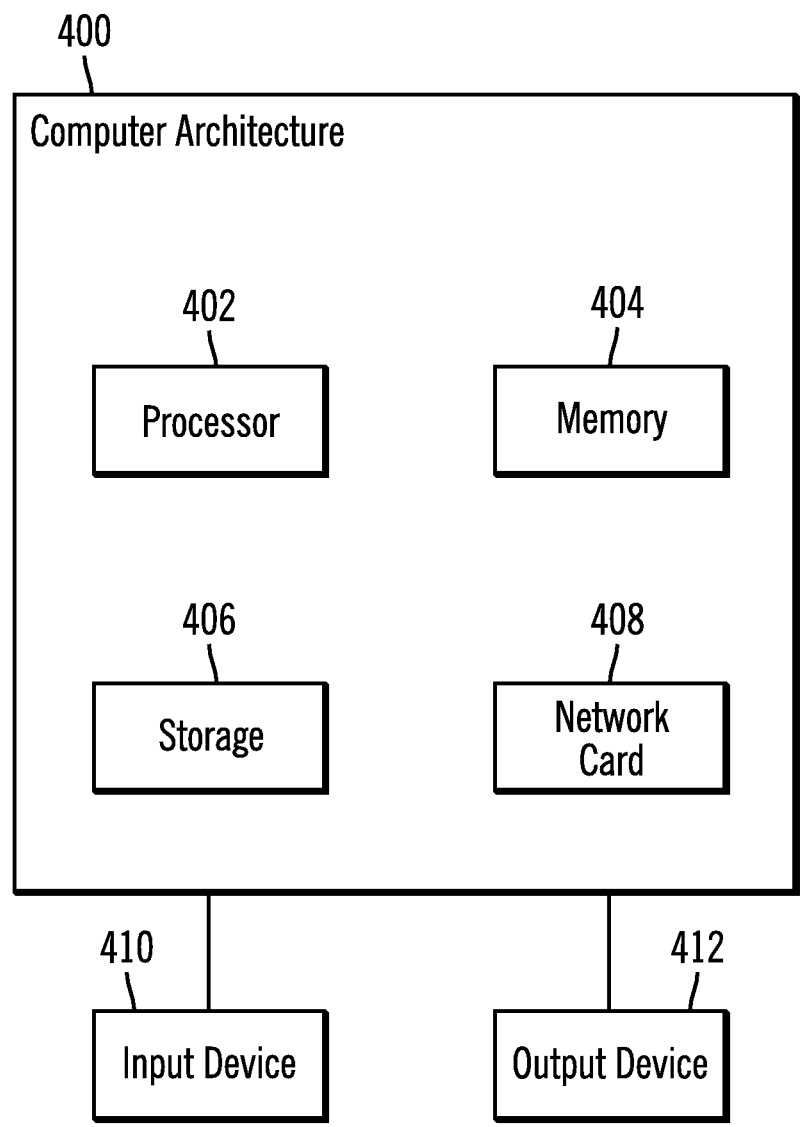
FIG. 9 illustrates a block diagram of a computer architecture in which certain described aspects of the embodiments are implemented.

FIG. 9 illustrates an embodiment of computing system architecture 400 that may be implemented, in whole or in part, in the node 2a, 2b, 2c of FIG. 1. The architecture 400 may include one or more processors 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor(s) 402 in a manner known in the art. The architecture further includes one or more adaptors 408 to enable communication over a network. An input device 410 may be used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture comprising a computer readable device having code implemented by nodes in a network to perform operations at each of the nodes, the operations comprising:
    maintaining version information of nodes in the network, wherein the version information for the nodes indicates a message version number of messages supported at the node, wherein the nodes supporting one message version number can receive messages having that message version number;
    using, when operating as a joining node attempting to join a quorum of nodes, the version information to determine whether there is at least one common message version number among the nodes in the quorum the joining node is attempting to join, wherein the nodes in the quorum support different sets of message version numbers and all nodes in the quorum support at least one common message version number;
    negotiating, by the joining node, to join the quorum of the nodes; and
    joining, by the joining node, the quorum in response to determining that the joining node supports at least one of the at least of the one common message version number supported by the nodes already in the quorum.

2. The article of manufacture of claim 1, wherein the nodes include node information indicating whether the nodes are in the quorum and in an offline or online state, wherein nodes in the offline state receive a subset of messages received by nodes in the online state, and wherein nodes in the online and offline states receive messages from other nodes negotiating to join the quorum, wherein the code performs transitioning node operations for a transitioning node comprising one of the nodes in the quorum, comprising:
    transitioning to the offline state;
    determining in the offline state whether the transitioning node has at least one message version number supported by the nodes in the quorum in the online and offline states in response to the transitioning node initiating an operation to return to the online state;

transitioning to the online state in the quorum in response to determining that the transitioning node supports one message version number that is common with respect to the other nodes in the quorum.

3. The article of manufacture of claim 2, wherein the transitioning node operations further comprise:

communicating information to the nodes in the quorum in the online and offline states indicating that the transitioning node is in the offline state in response to transitioning to the offline state;

communicating information to the nodes in the quorum in the online and offline states indicating that the transitioning node is in the online state in response to transitioning to the online state, wherein nodes receiving the communications on the state of the transitioning node update the node information for the transitioning node to indicate the offline or online state indicated in the communication.

4. The article of manufacture of claim 1, wherein the nodes include node information indicating whether the nodes are in the quorum and in an offline or online state, wherein the code performs joining node operations for a joining node that is not in the quorum, comprising:

determining whether the joining node supports at least one version number supported at all the nodes in the quorum in the offline and online states; and joining the quorum in the online state in response to determining that the joining node supports the at least one version number supported at all the nodes in the quorum.

5. The article of manufacture of claim 4, wherein the joining node operations further comprise:

arbitrating to obtain permission to negotiate to join the quorum to serialize the joining nodes negotiations to join the quorum, wherein the operation of determining whether the joining node supports the at least one version number supported at all the nodes in the quorum is performed in response to obtaining permission to negotiate to join the quorum.

6. The article of manufacture of claim 5, wherein the code performs offline node operations for an offline node that is in the offline state in the quorum, comprising:

determining whether the offline node supports at least one version number supported at all the nodes in the quorum in the offline and online states; and returning to the online state in response to determining that the offline node supports the at least one version number supported at all the nodes in the quorum, wherein the offline node does not need to arbitrate to obtain exclusive access to return to the online state.

7. The article of manufacture of claim 4, wherein the code performs updating node operations for an updating node in the quorum, comprising:

transitioning to exit the quorum in response to initiating an operation to update to support an update message version number;

applying the update message version number to the updating node in response to the updating node transitioning to exit the quorum; and performing the operations of the joining node to rejoin the quorum in response to updating to the update message version number.

8. The article of manufacture of claim 7, wherein the updating node operations further comprise:

determining whether the update message version number is supported by the nodes in the quorum in the offline and online state before applying the update to the update message version number, wherein the updating node exits the quorum to apply the update in response to determining that the update message version number is supported by the nodes in the quorum; and communicating a message to a user of the node that the update message version number of the update is not supported by the nodes in the quorum to enable the user to select to apply or not apply the update to the update message version number at the updating node.

9. A system, comprising:

a plurality of nodes that communicate over a network, wherein each node includes:

version information indicating a message version number of messages supported at the nodes in the network, wherein the nodes supporting one message version number can receive messages having that message version number;

a message manager to perform operations as a joining node, the operations comprising:

using the version information to determine whether there is at least one common message version number among the nodes in a quorum attempting to join, wherein the nodes in the quorum support different sets of message version numbers and all nodes in the quorum support at least one common message version number;

negotiating to join the quorum of the nodes;

initiating an operation as a sending node to send a selected message to a receiving node comprising one of the nodes in the network; and joining the quorum in response to determining that the joining node supports at least one of the at least of the one common message version number supported by the nodes already in the quorum.

10. The system of claim 9, wherein the nodes include node information indicating whether the nodes are in the quorum and in an offline or online state, wherein nodes in the offline state receive a subset of messages received by nodes in the online state, and wherein nodes in the online and offline states receive messages from other nodes negotiating to join the quorum, wherein the message manager performs operations as a transitioning node comprising one of the nodes in the quorum, comprising: transitioning to the offline state;

determining, in the offline state, whether the transitioning node has at least one message version number supported by the nodes in the quorum in the online and offline states in response to the transitioning node initiating an operation to return to the online state;

transitioning to the online state in the quorum in response to determining that the transitioning node supports one message version number that is common with respect to the other nodes in the quorum.

11. The system of claim 9, wherein the nodes include node information indicating whether the nodes are in the quorum and in an offline or online state, wherein the message manager performs operations as a joining node that is not in the quorum, comprising:

determining whether the joining node supports at least one version number supported at all the nodes in the quorum in the offline and online states; and joining the quorum in the online state in response to determining that the joining node supports the at least one version number supported at all the nodes in the quorum.

12. The system of claim 11, wherein the message manager operations as the joining node further comprises:
  arbitrating to obtain permission to negotiate to join the quorum to serialize the joining nodes negotiations to join the quorum, wherein the operation of determining whether the joining node supports the at least one version number supported at all the nodes in the quorum is performed in response to obtaining permission to negotiate to join the quorum.

13. The system of claim 12, wherein the message manager performs operations as an offline node in the offline state in the quorum comprising:
  determining the offline node supports at least one version number supported at all the nodes in the quorum in the offline and online states; and
  returning to the online state in response to determining that the offline node supports the at least one version number supported at all the nodes in the quorum, wherein the offline node does not need to arbitrate to obtain exclusive access to return to the online state.

14. The system of claim 11, wherein the message manager performs operations as an updating node in the quorum comprising:
  transitioning to exit the quorum in response to initiating an operation to update to support an update message version number;
  applying the update message version number to the updating node in response to the updating node transitioning to exit the quorum; and
  performing the operations of the joining node to rejoin the quorum in response to updating to the update message version number.

15. A method, comprising:
  maintaining, by nodes in a network, version information of nodes in the network, wherein the version information for the nodes indicates a message version number of messages supported at the node, wherein the nodes supporting one message version number can receive messages having that message version number;
  using, by a joining node attempting to join a quorum of nodes, the version information to determine whether there is at least one common message version number among the nodes in the quorum the joining node is attempting to join, wherein the nodes in the quorum support different sets of message version numbers and all nodes in the quorum support at least one common message version number;
  negotiating, by the joining node to join the quorum of the nodes; and
  joining the quorum in response to determining that the joining node supports at least one of the at least of the one common message version number supported by the nodes already in the quorum.

16. The method of claim 15, wherein the nodes include node information indicating whether the nodes are in the quorum and in an offline or online state, wherein nodes in the offline state receive a subset of messages received by nodes in the online state, and wherein nodes in the online and offline states receive messages from other nodes negotiating to join the quorum, further comprising:
  transitioning, by a transitioning node comprising one of the nodes in the quorum, to the offline state;
  determining, by the transitioning node in the offline state, whether the transitioning node has at least one message version number supported by the nodes in the quorum in the online and offline states in response to the transitioning node initiating an operation to return to the online state;
  transitioning, by the transitioning node, to the online state in the quorum in response to determining that the transitioning node supports one message version number that is common with respect to the other nodes in the quorum.

17. The method of claim 15, wherein the nodes include node information indicating whether the nodes are in the quorum and in an offline or online state, further comprising:
  determining, by a joining node that is not in the quorum, whether the joining node supports at least one version number supported at all the nodes in the quorum in the offline and online states; and
  joining, by the joining node, the quorum in the online state in response to determining that the joining node supports the at least one version number supported at all the nodes in the quorum.

18. The method of claim 17, further comprising:
  arbitrating, by the joining node not in the quorum, to obtain permission to negotiate to join the quorum to serialize the joining nodes negotiations to join the quorum, wherein the operation of determining whether the joining node supports the at least one version number supported at all the nodes in the quorum is performed in response to obtaining permission to negotiate to join the quorum.

19. The method of claim 18, further comprising:
  determining, by an offline node that is in the offline state in the quorum, whether the offline node supports at least one version number supported at all the nodes in the quorum in the offline and online states; and
  returning, by the offline node, to the online state in response to determining that the offline node supports the at least one version number supported at all the nodes in the quorum, wherein the offline node does not need to arbitrate to obtain exclusive access to return to the online state.

20. The method of claim 17, further comprising:
  transitioning, by an updating node in the quorum to exit the quorum in response to initiating an operation to update to support an update message version number;
  applying the update message version number to the updating node in response to the updating node transitioning to exit the quorum; and
  performing, by the updating node, the operations of the joining node to rejoin the quorum in response to updating to the update message version number.

21. An article of manufacture comprising a computer readable device having code implemented by nodes in a network to perform operations at each of the nodes, the operations comprising:
  initiating by a sending node operations to send a first message to a first receiving node and a second message to a second receiving node, wherein the sending node, the first receiving node, and the second receiving node are members of a quorum of at least three nodes that support different sets of message version numbers, wherein the sending, first receiving, and second receiving nodes each support at least one common message version number, wherein the sending and first receiving nodes support a first common message version number and wherein the sending and second receiving nodes support a second common message version number not supported by the first receiving node;

using, by the sending node, the first common message version number to communicate the first message to the first receiving node; and using, by the sending node, the second common message version number to communicate a second message to the second receiving node.

22. The article of manufacture of claim 21, wherein the operations further comprise:

maintaining at least one message table, wherein each message table is associated with one of the message version numbers, wherein each message table indicates a message specific version number for each supported message indicated in the message table, and wherein the message specific version number of the selected message is determined from the message table associated with the determined common message version number.

23. The article of manufacture of claim 22, wherein the sending node transmits different message specific versions of the selected message to different receiving nodes in the quorum if the different receiving nodes support different message version numbers also supported by the sending node that are associated with message tables providing different message specific version numbers for the selected message.

24. A system, comprising:

a plurality of nodes that communicate over a network, wherein each node includes:

version information indicating a message version number of messages supported at the nodes in the network, wherein the nodes supporting one message version number can receive messages having that message version number;

a message manager to perform operations as a sending node, the operations comprising:

initiating operations to send a first message to a first receiving node and a second message to a second receiving node, wherein the sending node, the first receiving node, and the second receiving node are members of a quorum of at least three nodes that support different sets of message version numbers, wherein the sending, first receiving, and second receiving nodes each support at least one common message version number, wherein the sending and first receiving nodes support a first common message version number and wherein the sending and second receiving nodes support a second common message version number not supported by the first receiving node;

using the first common message version number to communicate the first message to the first receiving node; and using the second common message version number to communicate a second message to the second receiving node.

25. The system of claim 24, wherein the nodes maintain at least one message table, wherein each message table is associated with one of the message version numbers, wherein each message table indicates a message specific version number for each supported message indicated in the message table, and wherein the message specific version number of the selected message is determined from the message table associated with the determined common message version number.

26. A method, comprising:

initiating by a sending node operations to send a first message to a first receiving node and a second message to a second receiving node, wherein the sending node, the first receiving node, and the second receiving node are members of a quorum of at least three nodes that support different sets of message version numbers, wherein the sending, first receiving, and second receiving nodes each support at least one common message version number, wherein the sending and first receiving nodes support a first common message version number and wherein the sending and second receiving nodes support a second common message version number not supported by the first receiving node;

using, by the sending node, the first common message version number to communicate the first message to the first receiving node; and using, by the sending node, the second common message version number to communicate a second message to the second receiving node.

27. The method of claim 26, further comprising:

maintaining, by the nodes, at least one message table, wherein each message table is associated with one of the message version numbers, wherein each message table indicates a message specific version number for each supported message indicated in the message table, and wherein the message specific version number of the selected message is determined from the message table associated with the determined common message version number.

* * * * *